United States Patent [19]

Frazerhurst et al.

[11] 4,020,993
[45] May 3, 1977

[54] METHOD OF AND MEANS FOR LIQUID EXTRACTION FROM GALL BLADDERS

[75] Inventors: Lyndon F. Frazerhurst, Hamilton; Anthony J. Robinson, Johannesburg; Peter G. Macfarlane, Frankton, all of New Zealand

[73] Assignee: New Zealand Inventions Development Authority, Wellington, New Zealand

[22] Filed: May 20, 1975

[21] Appl. No.: 579,206

[30] Foreign Application Priority Data

May 20, 1974 New Zealand ............... 174311

[52] U.S. Cl. ................. 241/24; 241/79.3; 241/143; 241/236
[51] Int. Cl.² ................. B02C 23/10
[58] Field of Search ......... 241/24, 69, 75, 79.3, 241/141, 142, 143, 144, 145, 224, 227, 232, 233, 235, 236; 99/510, 513, 558; 83/345, 346, 347, 505, 506

[56] References Cited

UNITED STATES PATENTS

| | | | |
|---|---|---|---|
| 199,605 | 1/1878 | Wegmann | 241/143 |
| 416,904 | 12/1889 | Dawson | 241/145 |
| 753,304 | 3/1904 | Parry | 241/235 |
| 1,551,875 | 9/1925 | Hall | 241/227 |
| 2,360,964 | 10/1944 | Moroni | 99/513 |
| 2,417,599 | 3/1947 | Joyce, Jr. | 241/236 |
| 2,728,950 | 1/1956 | Annesser | 264/147 |
| 3,682,028 | 8/1972 | Clayton et al. | 83/345 |

*Primary Examiner*—Granville Y. Custer, Jr.
*Attorney, Agent, or Firm*—Millen & White

[57] ABSTRACT

A machine and method for collecting gall from animal bladders is provided. The machine includes contra-rotating rollers which cut and squeeze gall bladders fed onto the rollers. A perforated drum receives the gall and cut bladders issuing from the rollers and separates the gall from the cut bladders. A high yield of gall is attained.

14 Claims, 9 Drawing Figures

METHOD OF AND MEANS FOR LIQUID EXTRACTION FROM GALL BLADDERS

This invention relates to a method of and means for the extraction of liquid from animal gall bladders.

Gall, a liquid secreted by the liver and stored during periods of fasting in the gall bladder, finds a major industrial use as a raw material for the synthesis of corticosteriod drugs. The meat industry recovers gall from sheep, cattle and pigs but the present methods of separating the bladder from its contents vary widely and are largely inefficient. Existing collection methods vary from labour intensive manual cutting of each bladder followed by simple filtering, to mechanical mincing and squeezing methods which often have low recovery efficiencies. There is, therefore, the need for a more satisfactory manner of performing the above referred separation.

The present invention is concerned with a method of and a machine for collecting gall from animal bladders whereby the operation is effectively performed.

Accordingly in one aspect the invention consists in a method of collecting gall from animal bladders wherein a supply of animal bladders is subjected to cutting and squeezing action by sharp-ridged and smooth surface contra-rotating rollers to separate the gall liquid from the cut bladders, the liquid and the cut bladders passing to a perforated rotating drum and the liquid passing through the perforations in the drum into a trough.

In another aspect the invention consists in a machine for collecting gall from animal bladders comprising a hopper having an outlet located above a pair of bladder cutting and squeezing contra-rotatable rollers, a chute located below such rollers for receiving gall liquid and cut animal bladders and leading to a trough having a perforated drum capable of rotation within the trough and means for rotating the rollers and drum whereby gall liquid from the cut bladders will pass through the perforations of the drum into the trough.

In the following description reference will be made to the accompanying drawings which illustrate preferred forms of the machine and in which.

In further describing the invention, as a preferred embodiment, the machine includes two sections, one for processing mutton bladders and the other for processing beef bladders.

Figure 1:
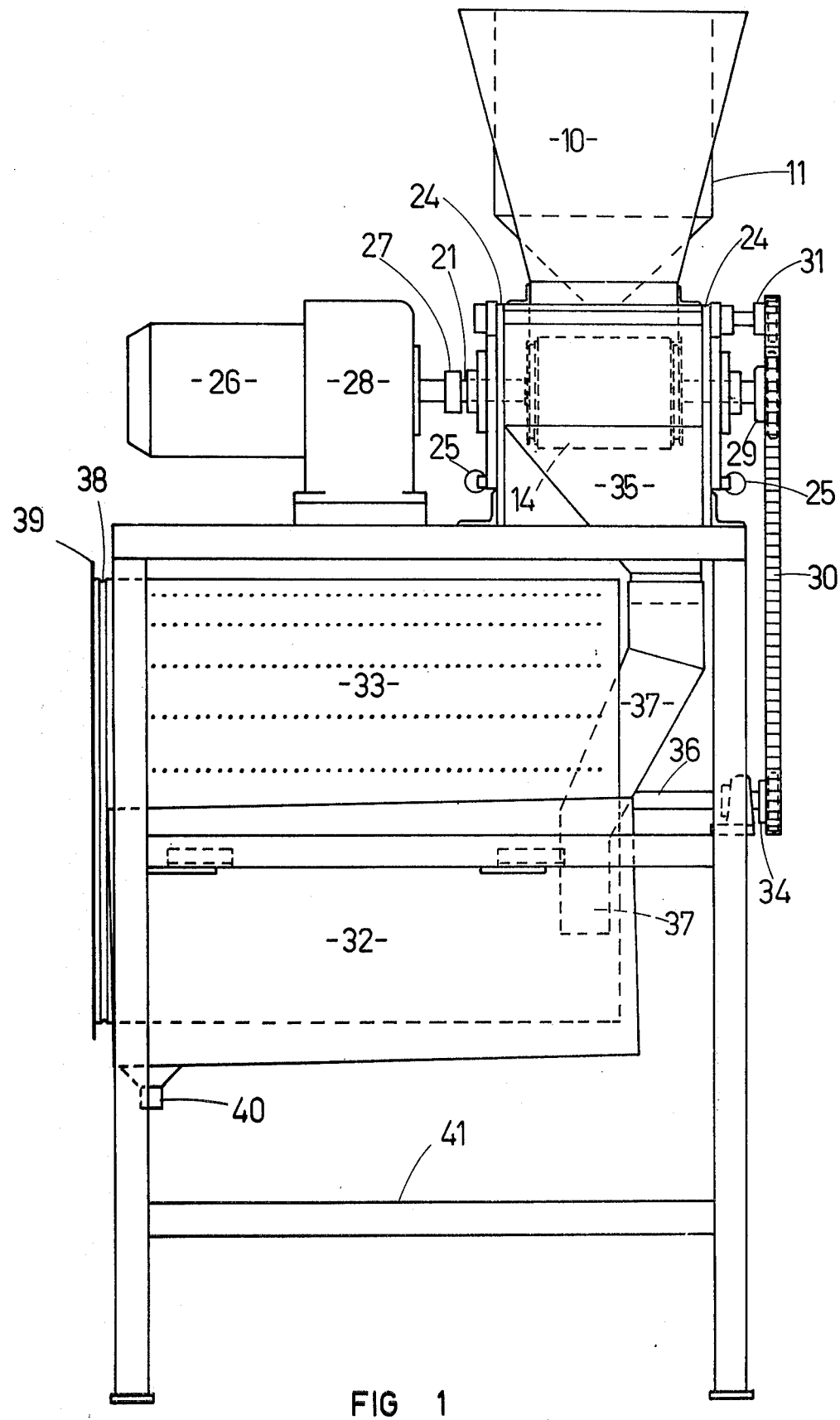
FIG. 1 is a side view of the machine.
Figure 2:
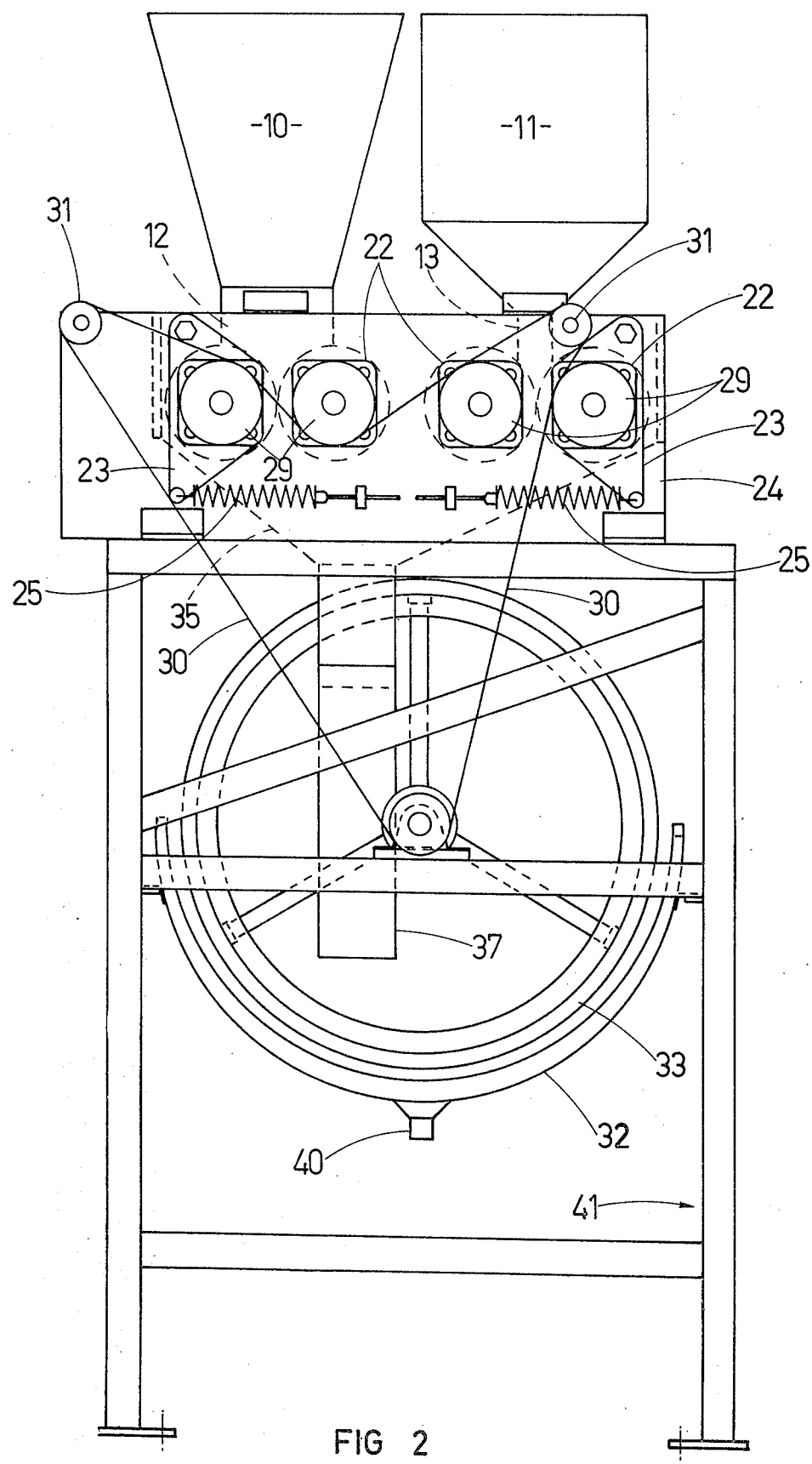
FIG. 2 is a front elevation of the machine of FIG. 1.
Figure 3:
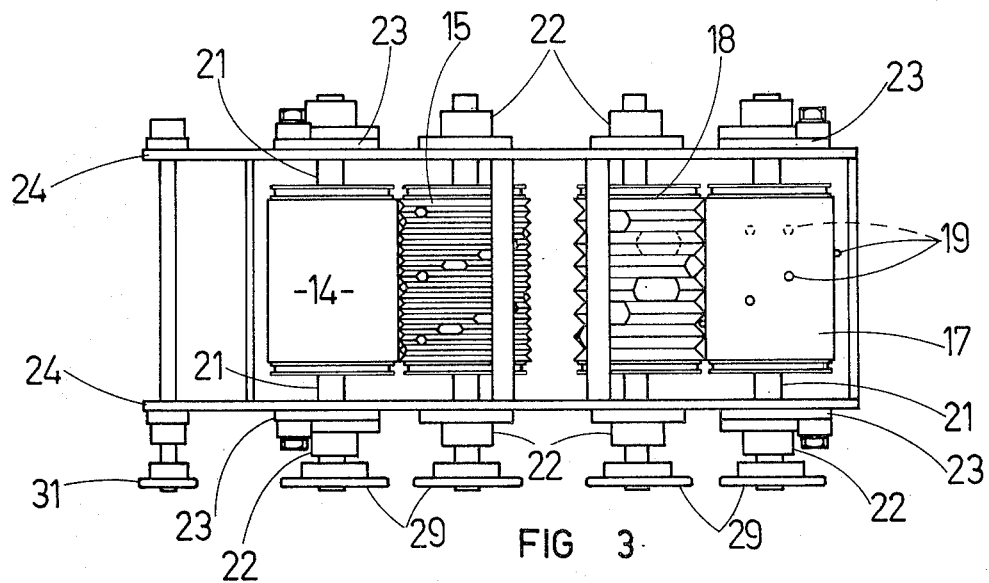
FIG. 3 is plan view of the roller section of the machine of FIGS. 1 and 2 but with the hoppers removed to show more clearly the pairs of rollers.

Both sections of the machine include a hopper and in FIGS. 1 and 2 two different forms of hoppers are shown in order to distinguish between the two sections of the machine with hopper 10 indicating the mutton section and hopper 11 the beef section. Either form of hopper can be used but preferably a hopper of the type shown with the beef section is used on both sections. The essential difference between the hoppers 10 and 11 lies in the feed chutes 12 and 13 respectively with the feed chute 12 of the beef side being much wider than chute 13 of the mutton hopper 11.

One of the rollers of the pair in the mutton section is a smooth peripheral roller 14, whilst the other roller 15 has circumferential V-shaped ridges and grooves with a pitch of about 10 mm. The external edges of the ridges or tops of the grooves have a width of about 0.5–1mm. Two scallops 16 of about 20 mm radius are cut out of each ridge and positioned in a helical path around the roller surface. Positioned directly below this pair of rollers is the collecting chute 35 of the machine.

One of the rollers of the pair in the beef section is a smooth peripheral roller 17, whilst the other roller 18 has circumferentially V-shaped grooves and ridges of about 25 mm and scallops 20 of about 100 mm radius. Also positioned directly below this pair of rollers is the collecting chute 35 of the machine.

The smooth roller 17 of the pair for processing beef bladders has a number of spikes 19 distributed over its surface such that these spikes align with the centre of the grooves in the associated groove roller 18.

All the rollers are mounted on their own shafts 21 which are journalled at each end in bearings 22. The bearings 22 of the smooth peripheral rollers 14 and 17 are fixed on plates 23 which are pivotally mounted on the frame members 24 between which all the rollers are positioned. The movable plates 23 are retained in position by adjustable springs 25 which maintain contact between the smooth and grooved rollers of each pair of rollers. The shaft 21 of the grooved roller 15 is driven by an electric motor 26 via a reduction gearbox 28 and a coupling 27. The electric motor 26 is of a completely sealed type and incorporates therewith the reduction gearbox 28. Pulley wheels opposite are provided on the ends of the shafts 21 opposited the drive end and a chain 30 is threaded over these pulleys. Two idler pulleys 31 are included and the purpose for this will become apparent from the following description. The chain 30 drives the shafts 21 at a suitable speed of about 25 r.p.m.

It is important that the machine include safety features to prevent damage or jamming due to the entry of a hard foreign object such as a meat hook. Reference to FIG. 2 shows the particular arrangement of the chain 30 and pulleys 29 and 31 which allows the pulleys 29 of either of rollers 14 and 17 to become disengaged from the drive chain 30 when the respective plates 23 pivot to move the pair of rollers apart when a foreign object passes between the said pair of rollers. This movment prevents damage to the rollers. In addition the coupling 27 is of a shear pin type which will shear if a foreign object jams the mechanism. Still further overload circuit breakers can be incorporate in the electrical circuit.

The machine also includes the trough 32 and separating drum 33. The drum 33 can be one of about 500 mm diameter and 600 mm length with a perforated peripheral surface. The perforations can be about 6 mm diameter holes which are swaged outwardly from the inside of the drum. The drum 33 is inclinded at a small angle to the horizontal such as about ¼°. A drive chain 30 passes over a pulley 34 on the drum shaft 36 so as to rotate the drum at an optimum speed of about 40 r.p.m.

The drum 33 is open-ended so that lower end of a delivery chute 37 leading fom the collecting chute 35 of the two bladder processing sections will locate within the ambit of the drum 33.

A strengthening groove 38 is formed at the output end of the drum 33 which also serves to prevent gall from moving over the end off the outer surface of the drum. A small lip 39 can also be provided for this purpose. The outward swaging of the holes in the drum surface prevents the bladders within the drum from catching on the inside surface.

The trough 32 is one of a size so as to encompass a lower portion of the drum 33 and has a gall liquid drainage outlet 40. The drum 33 and trough 32 are mounted in a frame 41 which also supports the sub-frames 24, rollers and drive mechanism.

In its method of operation, the appropriate types of animal bladders are placed in the hoppers 10 and 11 of the two sections.

These bladders drop onto the rollers of that section and are cut by being nipped between the ridges of the grooved roller and the smooth roller.

The scallops and spikes assist in initiating the cutting action and draining the bladders or extraneous material through the pairs of rollers.

The cut skins and released gall liquid drop via the chutes 35 and 37 into the rotating separation drum 33. The liquid passes through the perforations in the drum and is collected by the trough 32, thence to a collection vessel (not shown). The skins are drained and eventaully ejected from the drum to fall into another collection vessel (not shown).

A feature which can be included in the machine but is not shown in the drawings is a stripper plate positioned below each of the grooved rollers 15 and 18. Each plate has teeth cut in its upper edge and these teeth are profiled to fit with the grooves of the associated grooved roller. The plate is inclined toward the direction of rotation of the associated grooved roller and its purpose is to clean off any matter sticking to the surface of the drum. Alternatively these stripper plates can be incorporated with the lower edges of the feed chutes 12 and 13 but this arrangement has been found to be inferior to the stripper plates positioned below the rollers and within the collecting chute 35. These plates can be mounted by hexagonal shafts mounted between the sub-frames 24.

Figure 8:
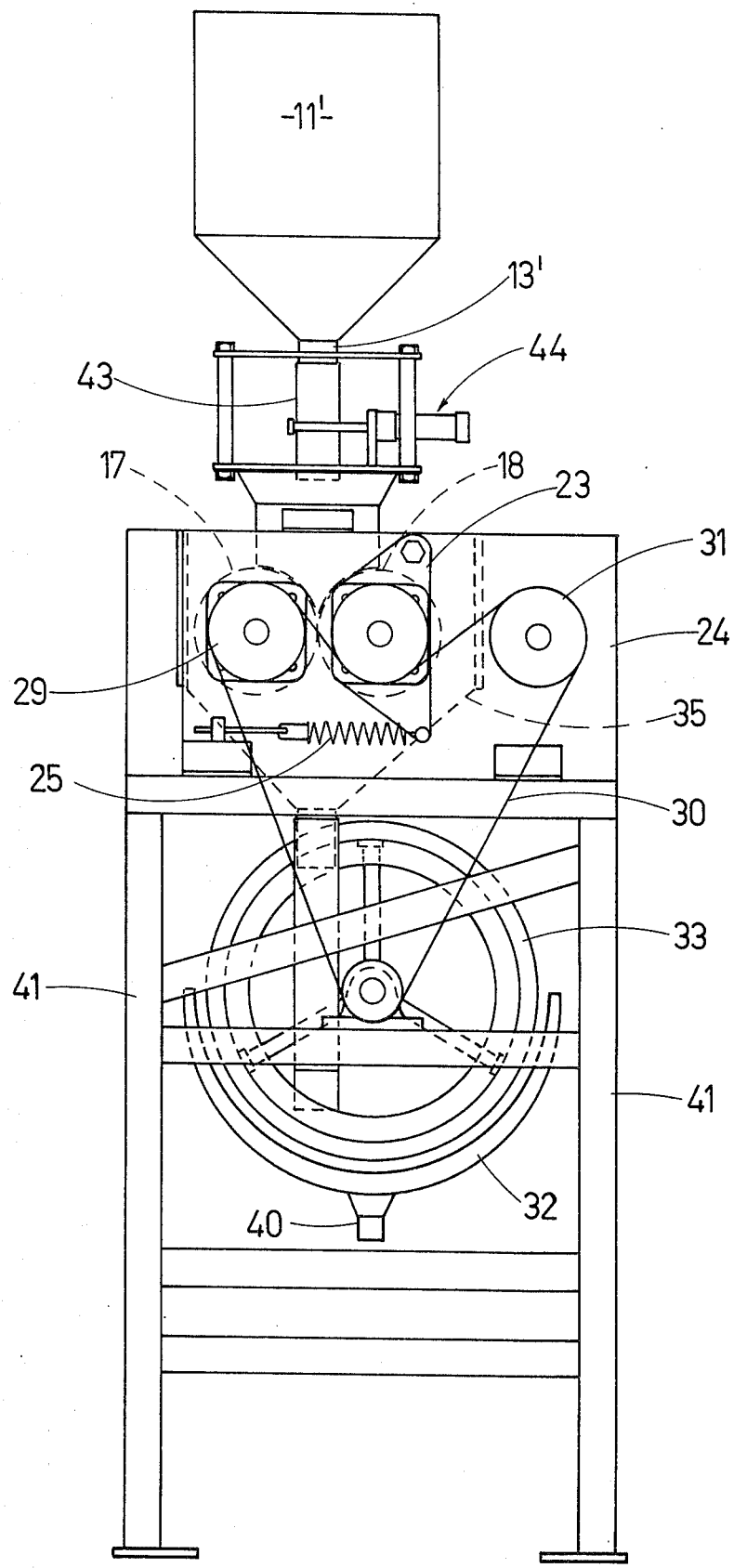
FIG. 8 is a front elevation of a second form of the machine.

The above described machine is designed for meat processing works wherein the beef and mutton chains work in close proximity or where it is convenient to run chutes or conveyors from the floor to the hoppers 10 and 11. In some cases a dual machine will not be practical and accordingly the two sections can be divided to form separate machines which can be positioned alongside or beneath the appropriate chain. Such a single machine is shown in FIG. 8.

This machine is designed to process mutton bladders and basically consists of one half of the machine in FIGS. 1 and 2. A different hopper arrangement is, however, shown and this includes a feed mechanism not shown in the machine previously described. The feed mechanism consists of a flexible rubber tube 43 located at the outlet 13' of the hopper 11' and a pneumatic cylinder 44 or similar machinical device arranged so as to close the tube by a squeezing action under extension of the pneumatic cylinder or the device. The tube is permitted to open periodically. This feed mechanism prevents overloading of the rollers 17 and 18 of the mutton processing section whether it be part of the machine of FIGS. 1 and 2 or FIG. 8 as it limits the flow of such bladders from the hopper 11.

The characteristics of beef bladders obviate the need for such a feed mechanism.

Figure 9:
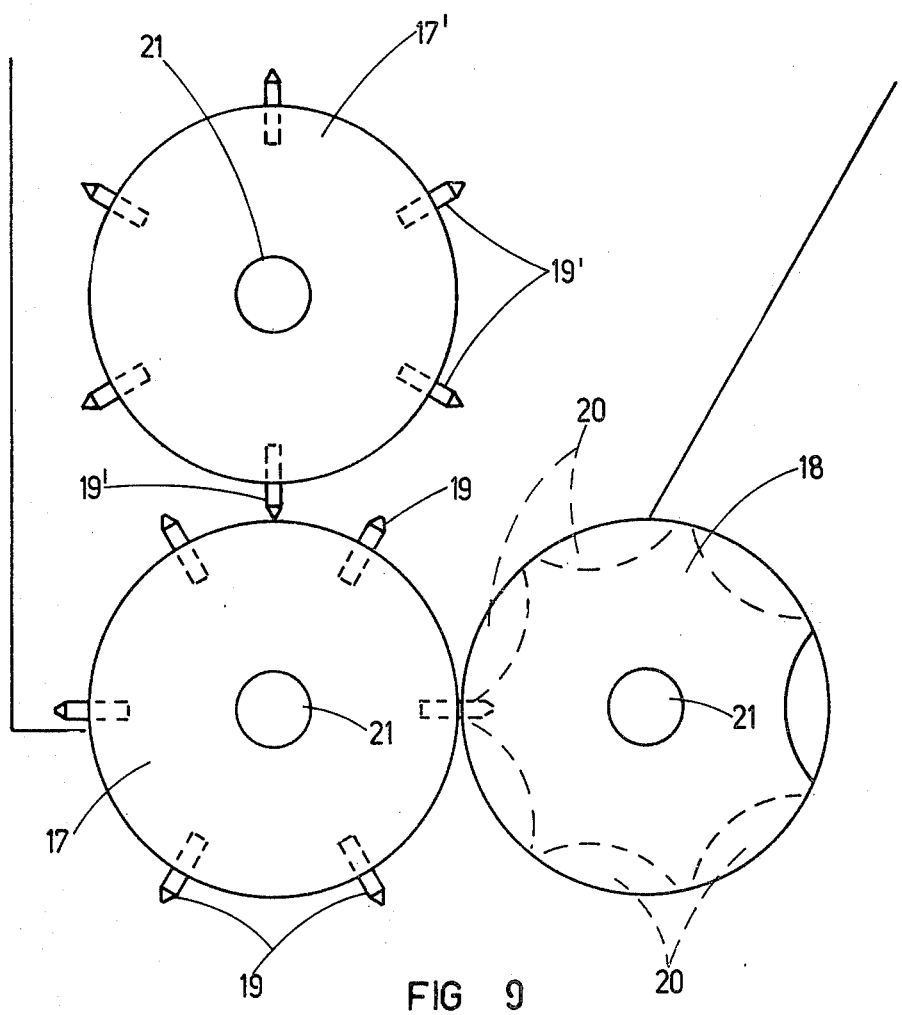
FIG. 9 is a modified form of the roller layout.
Figure 4:
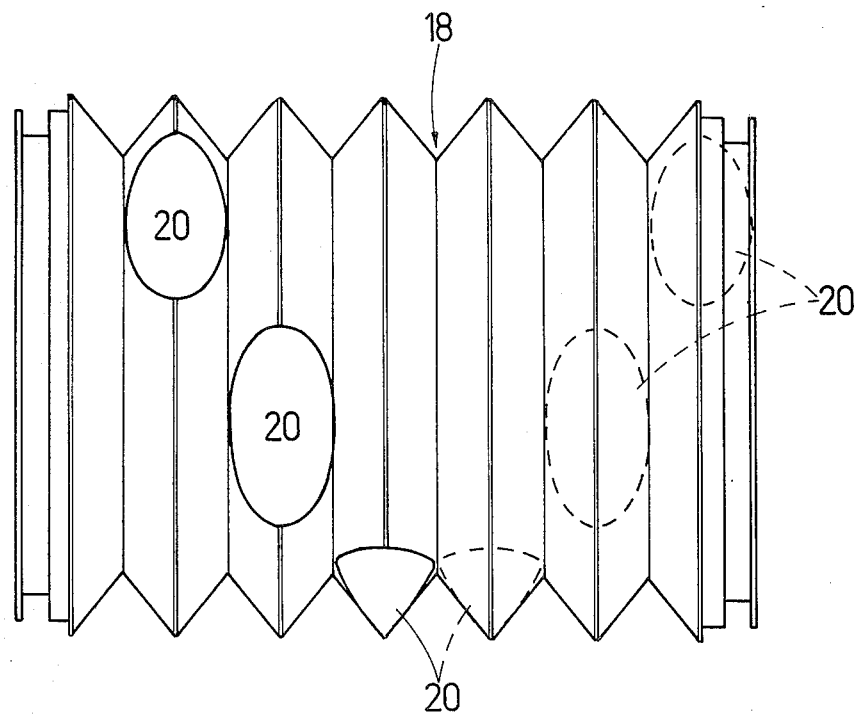
FIG. 4 is an elevational view of one of the rollers.
Figure 5:
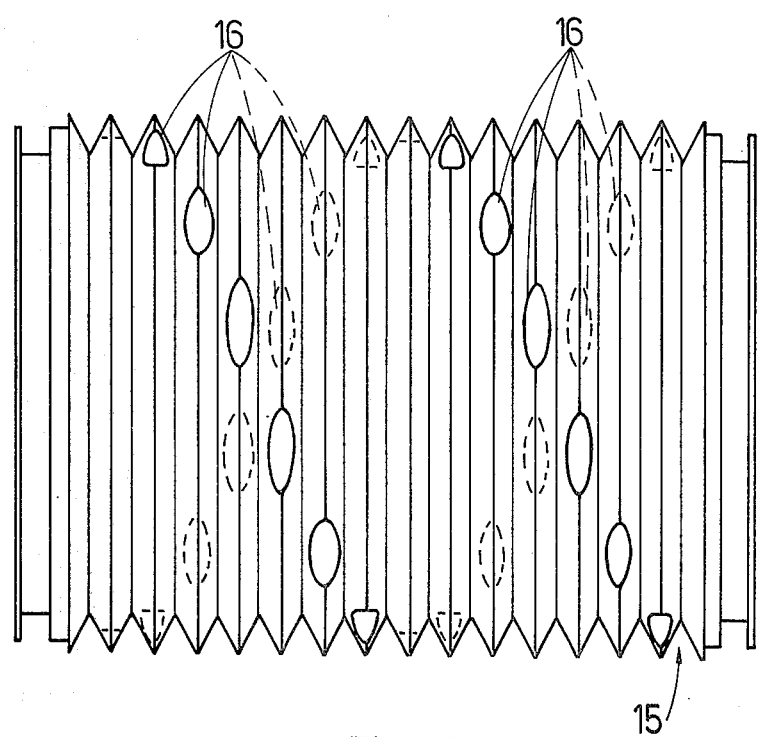
FIG. 5 is an elevational view of a further roller.
Figure 6:
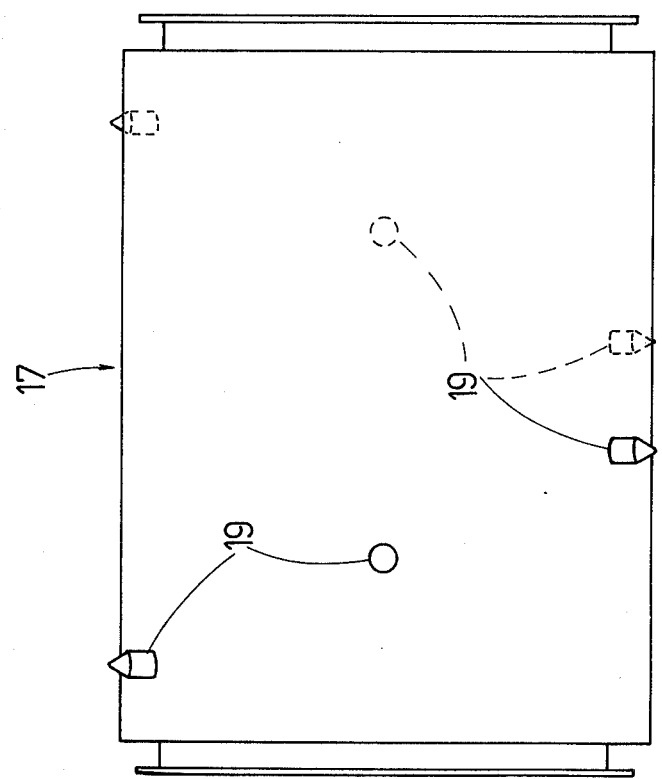
FIG. 6 is an elevational view of a still further roller.
Figure 7:
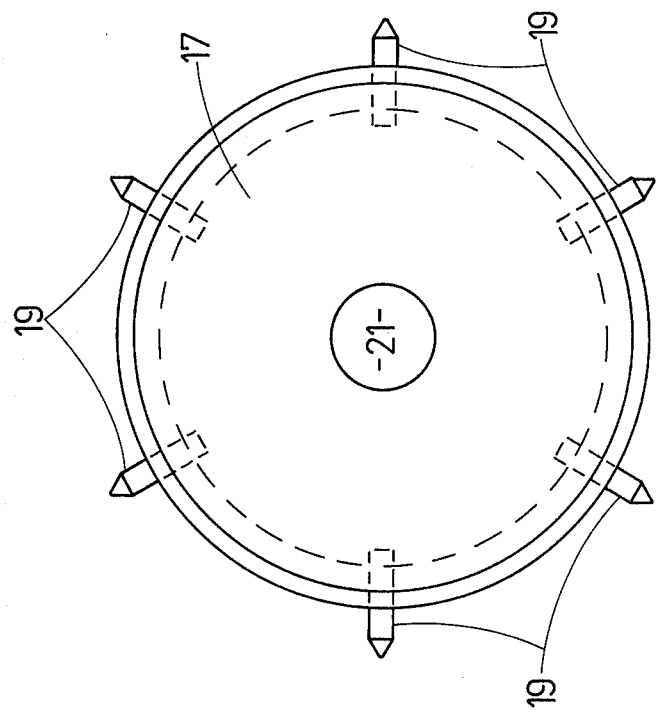
FIG. 7 is an end view of the roller of FIG. 6.

Referring now to FIG. 9 a modified arrangement of the beef rollers is shown. This arrangement includes a further roller 17' which is of smooth periphery and includes spikes 19'. This roler 17' is identical or similar to the earlier described roller 17. The purpose of the third roller is to provide a downward push on incoming bladders to ensure they enter into the lower pair of rollers 17 and 18 especially when excessive amounts of liver are attached to bladders. The feed part of the hopper 11 is suitably altered to allow for the third roller and this is shown diagrammatically in FIG. 9.

Further additions to the machine can include a pump arrangement associated with the outlet 40 to facilitate transfer of gall from the trough 32 to a holding tank. A by-pass valve can also be associated with the outlet 40 to permit the inclusion of a water service for washing purposes. These features will be apparent to those skilled in the art and as they in no way alter the present invention will not be described in detail.

The invention therefore provides a machine which will cleanly cut gall bladders of animal origin and permit the efficient separation of the bladder skins and the liquid gall with the minimal inclusion of solid matter. It has been found that a high recovery rate of gall can be achieved with a 90% yield being easily attained. In favourable conditions higher yields can be expected. The slope of the drum i.e., 0.25° to the horizontal ensures that the bladders remain within the drum for 1–2 minutes which is sufficient for complete drainage of the residue gall. Maximum efficiency occurs when the drum rotates at a speed of 40 r.p.m. or within the range of 50 to 60 r.p.m. (for drums of 508 mm and 305 mm diameter respectively).

What is claimed is:

1. A method of collecting gall from animal bladders wherein a supply of animal bladders is subjected to cutting and squeezing action by a pair of contra-rotating rollers to separate the gall liquid from the cut bladders, one of said rollers having circumferential V-shaped ridges and grooves formed in its surface with at least one scallop formed in each ridge, the liquid and the cut bladders passing to a perforated rotating drum and the liquid passing through the perforations in the drum into a trough.

2. A machine for collecting gall from animal bladders comprising at least one pair of bladder cutting and squeezing contra-rotatable rollers, one of the rollers of the or each pair of rollers has circumferential V-shaped ridges and grooves formed in its surface with at least one scallop formed in each ridge, means for directing bladders onto the or each pair of rollers, a chute located below such rollers for receiving gall liquid and cut animal bladders and leading to a perforated drum capable of rotation within a trough and means for rotating the rollers and the drum whereby gall liquid from the cut bladders will pass through the perforations of the drum into the trough.

3. The machines according to claim 2 wherein said scallops are positioned in a helical path around the roller surface.

4. The machine according to claim 3 wherein the other of the or each pair of rollers is a smooth peripheral roller.

5. The machine according to claim 4 wherein a further smooth peripheral spiked roller is provided about and meshing with the first mentioned spiked roller.

6. The machine according to claim 4 wherein at least one smooth peripheral roller has a number of spikes distributed over its surface, the said spikes aligning with the center of the grooves of the other roller of the pair.

7. The machine according to claim 6 wherein two pairs of rollers are provided and a single hopper is associated with, and has an outlet located above, each said pair, the rollers of one pair consisting of a smooth peripheral roller and a grooved roller and the rollers of the other pair consisting of a smooth spiked roller and a grooved roller, the grooved roller of each pair having at least one scallop cut in each ridge with the scallops in each roller being positioned in a helical path around the roller surface.

8. The machine according to claim 7 wherein the shaft of one smooth roller is coupled at one end thereof via a reduction gearbox to a prime mover, the ends of the shafts of all rollers opposite to the driven end of the smooth roller being provided with pulley wheels around which a drive chain passes, said drive chain also passing around a pulley mounted on the drum shaft.

9. The machine according to claim 8 wherein the shafts of the smooth peripheral rollers are journalled in bearings fixed to pivotally mounted plates, said plates being spring biased to maintain the roller therebetween in contact with its associated roller but free to move away from the said associated roller if a hard foreign object passes between the pair of rollers, the drive chain and pulley wheels on the roller shafts being so arranged that upon parting of the rollers of one pair of movement of the pivoted plates the pulley wheel of the shaft journalled between the plates disengages from the said chain.

10. The machine according to claim 9 where the coupling is of the shear pin type.

11. The machine according to claim 7 wherein one or both of the hoppers is provided with a feed mechanism in the outlet thereof, said feed mechanism consisting of a flexible rubber tube located in the outlet and a mechanical device arranged to close the tube by a squeezing action.

12. The machine according to claim 7 wherein the drum is arranged to rotate at a speed in the range of about 40 to 60 r.p.m. and the rollers rotate at about 25 r.p.m.

13. The machine according to claim 2 wherein the drum is open ended and mounted for rotation on a central shaft, said shaft being inclined at 0.25° to the horizontal with the delivery chute entering said drum at the elevated end thereof, the surface of the drum being perforated by a series of outwardly swaged holes, and includes a peripheral groove formed near the lower end of the drum.

14. The machine according to claim 13 wherein the trough is provided with an outlet at the end below the lower end of the drum.

* * * * *